United States Patent
Kikuchi et al.

(10) Patent No.: US 11,414,788 B2
(45) Date of Patent: Aug. 16, 2022

(54) SPINNING APPARATUS

(71) Applicant: KABUSHIKI KAISHA TOSHIBA, Minato-ku (JP)

(72) Inventors: Yuma Kikuchi, Kashiwazaki (JP); Tomomichi Naka, Kashiwazaki (JP); Kenya Uchida, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 11 days.

(21) Appl. No.: 16/787,113

(22) Filed: Feb. 11, 2020

(65) Prior Publication Data
US 2020/0173055 A1 Jun. 4, 2020

Related U.S. Application Data

(63) Continuation of application No. PCT/JP2018/034031, filed on Sep. 13, 2018.

(30) Foreign Application Priority Data

Sep. 20, 2017 (JP) .............................. JP2017-180663

(51) Int. Cl.
*D01D 5/00* (2006.01)
*H01M 50/409* (2021.01)

(52) U.S. Cl.
CPC ......... *D01D 5/0061* (2013.01); *D01D 5/0023* (2013.01); *H01M 50/409* (2021.01)

(58) Field of Classification Search
CPC .. D01D 5/0061; D01D 5/0023; D01D 5/0076; D01D 5/0092
See application file for complete search history.

(56) References Cited

U.S. PATENT DOCUMENTS

| 2,048,651 | A | | 7/1936 | Norton | |
| 4,368,561 | A | * | 1/1983 | Trutzschler | D01G 15/78 19/111 |
| 4,996,746 | A | * | 3/1991 | Verzilli | D01G 15/78 19/102 |
| 10,135,050 | B2 | | 11/2018 | Uematsu et al. | |

(Continued)

FOREIGN PATENT DOCUMENTS

| JP | 2008-034295 A | 2/2008 |
| JP | 2013-091869 A | 5/2013 |

(Continued)

OTHER PUBLICATIONS

International Search Report dated Nov. 27, 2018 in PCT/JP2018/034031 filed on Sep. 13, 2018, 2 pages.

*Primary Examiner* — Niki Bakhtiari
*Assistant Examiner* — Emmanuel S Luk
(74) *Attorney, Agent, or Firm* — Oblon, McClelland, Maier & Neustadt, L.L.P.

(57) ABSTRACT

According to one embodiment, a spinning apparatus includes a spinning head and a rotational brush. An organic material is filled up inside the spinning head, and the spinning head ejects the organic material on a surface of a base to form a sheet of the organic fiber on the surface of the base. The rotational brush includes a plurality of brush bristles and is rotated while the brush bristles are in contact with the sheet in the surface of the base. The rotational brush strips the organic fiber from a part of the sheet by the rotation.

6 Claims, 9 Drawing Sheets

(56) References Cited

U.S. PATENT DOCUMENTS

| | | | |
|---|---|---|---|
| 2005/0233102 A1* | 10/2005 | Kagawa | B29C 59/04 428/43 |
| 2011/0236769 A1* | 9/2011 | Xie | H01M 4/8605 429/401 |
| 2013/0177766 A1* | 7/2013 | Grebe | B29C 64/182 428/411.1 |
| 2013/0319512 A1* | 12/2013 | Obana | H01G 9/2022 136/254 |
| 2015/0072212 A1* | 3/2015 | Mikami | D04H 3/016 429/144 |
| 2016/0052193 A1* | 2/2016 | Okafuji | G03F 7/0002 425/470 |
| 2017/0362741 A1 | 12/2017 | Sakai | |
| 2020/0085182 A1* | 3/2020 | Uchida | A46B 13/001 |

FOREIGN PATENT DOCUMENTS

| | | |
|---|---|---|
| JP | 5624653 B2 | 11/2014 |
| WO | WO 2014/017567 A1 | 1/2014 |
| WO | WO 2017/158872 A1 | 9/2017 |

* cited by examiner

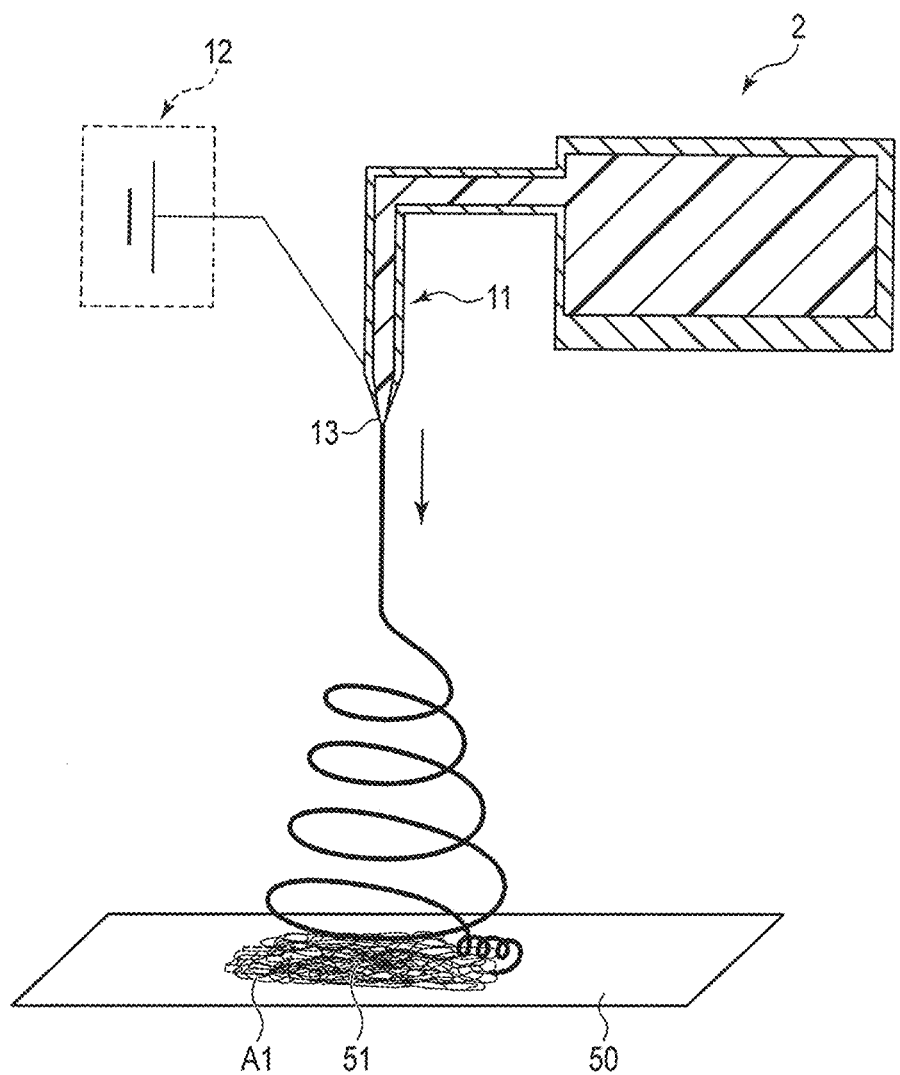
F I G. 2A
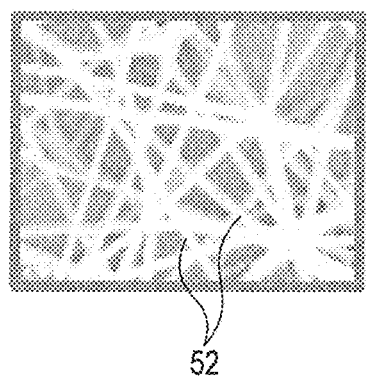
F I G. 2B

SPINNING APPARATUS

CROSS-REFERENCE TO RELATED APPLICATIONS

This is a Continuation Application of PCT Application No. PCT/JP2018/034031, filed Sep. 13, 2018 and based upon and claiming the benefit of priority from prior Japanese Patent Application No. 2017-180663, filed Sep. 20, 2017, the entire contents of which are incorporated herein by reference.

FIELD

Embodiments described herein relate to a spinning apparatus.

BACKGROUND

In certain type of batteries such as a secondary battery, a separator for insulating a positive electrode from a negative electrode is formed integrally with the positive electrode or the negative electrode. When this type of battery is manufactured, an organic fiber sheet is formed on a surface of an electrode (positive electrode or negative electrode), which is formed integrally with a separator, by an electrospinning method, for example. The organic fiber sheet serves as such a separator between the positive electrode and the negative electrode.

Each of the positive electrode and the negative electrode includes a current collector made of a metal foil, and an active material supported on the surface of the current collector. In each of the positive electrode and the negative electrode, one of the edges of the current collector and its vicinity constitute a current collecting tab, and no active material is supported on the current collecting tab. In the current collecting tab, the surfaces of the current collector are joined, and the current collector is joined to a backup lead, etc. In a case where the separator is integrally formed with either one of the electrodes by the electrospinning method as described above, it is necessary to remove, after the organic fiber sheet is formed entirely on the surface of the electrode by the electrospinning method, organic fiber from an area where the active material is not supported in the current collector, in other words, an area where a current collecting tab is formed.

With the electrospinning method, it is possible, by some control, to avoid forming the organic fiber sheet in a portion of the current collector where the active material is not supported. However, such a control in the electrospinning method may affect the evenness of a film thickness of the organic fiber sheet.

BRIEF DESCRIPTION OF THE DRAWINGS

FIG. 2A is a schematic diagram showing a configuration of a sheet forming machine according to the embodiment.

FIG. 2B is an enlarged image of an area A1 indicated in FIG. 2A.

DETAILED DESCRIPTION

According to one embodiment, a spinning apparatus includes a spinning head and a rotational brush. An organic material is filled up inside the spinning head, and the spinning head ejects the organic material on a surface of a base to form a sheet of the organic fiber on the surface of the base. The rotational brush includes a plurality of brush bristles and is rotated while the brush bristles are in contact with the sheet in the surface of the base. The rotational brush strips the organic fiber from a part of the sheet by the rotation.

Hereinafter, an embodiment will be described with reference to FIGS. 1 to 10C.

Figure 1:
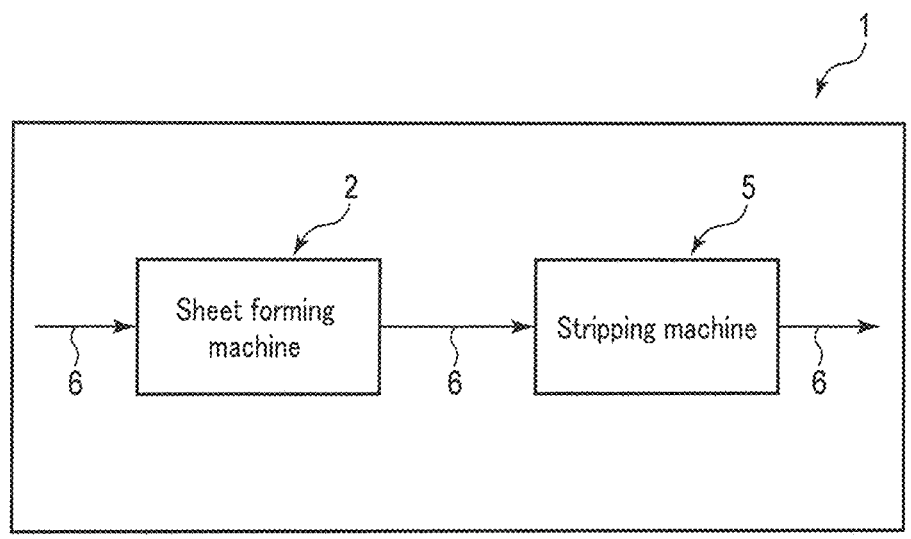
FIG. 1 is a schematic diagram showing a spinning apparatus according to an embodiment.

FIG. 1 is a diagram showing a spinning apparatus 1 according to an embodiment. As shown in FIG. 1, the spinning apparatus 1 includes a sheet forming machine 2 and a stripping machine 5. In the spinning apparatus 1, a transfer line 6 is formed. In the spinning apparatus 1, a base 50 (see FIGS. 2A and 3) is transferred by the transfer line 6, from the sheet forming machine 2 to the stripping machine 5.

FIG. 2A shows a configuration of the sheet forming machine 2. FIG. 2B shows an enlarged image of an area A1 indicated in FIG. 2A. As shown in FIG. 2A, the sheet forming machine 2 includes a spinner head 11 and a voltage generator 12. According to the present embodiment, in the sheet forming machine 2, a sheet 51 of organic fiber 52 is formed on the surface of the base 50 by an electrospinning method (see FIG. 2B). The inside of the spinner head 11 is filled with a solution in which an organic material dissolves in a solvent. The spinner head 11 includes a nozzle 13 capable of ejecting the organic material filled in the spinner head 11. One or a plurality of nozzles 13 may be provided. As an organic material to be filled in the spinner head 11, one or more of polyolefin, polyether, polyimide, polyketone, polysulfone, cellulose, polyvinyl alcohol (PVA), polyamide, polyamide-imide, and polyvinylidene fluoride (PVdf) are selected, for example. Polyolefin includes polypropylene (PP) and polyethylene (PE), for example.

Inside the spinner head 11, the organic material is dissolved in a concentration from 5% by mass to 60% by mass in a solvent. As a solvent in which the organic material is dissolved, a given solvent such as dimethylacetamide (DMAc), dimethylsulfoxide (DMSO), N,N-dimethylformamide (DMF), N-methylpyrrolidone (NMP), water, and alcohol, for example, is used. If the organic material has low solubility, the organic material in a sheet-like shape may be melted by laser, for example, while the electrospinning method is being performed. In the solution of the organic material, an organic solvent having a high boiling point may be mixed with a solvent having a low melting point.

The voltage generator 12 applies a voltage (high voltage) between the spinner head 11 and the base 50. The voltage applied between the spinner head 11 and the base 50 leads to ejection of the organic material solution from the nozzle 13 of the spinner head 11 to the surface of the base 50. As a result, a sheet (layer) 51 of the organic fiber 52 is formed on the surface of the base 50. The sheet 51 is an insulating layer having an electrical insulation property.

The voltage between the spinner head 11 and the base is appropriately determined in correspondence with the kind of the solvent and the solute, the boiling point and the vapor pressure curve of the solvent, the solution concentration, the temperature, the shape of the nozzle 13, and the distance between the base 50 and the nozzle 13, for example, and is appropriately determined within a range of, for example, 1 kV to 100 kV. The supply speed of the solution of the organic material is appropriately determined in correspondence with the solution concentration, the solution viscosity, the temperature, the pressure, the applied voltage, and the shape of the nozzle 13, for example.

Formation of the sheet 51 of the organic fiber 52, namely, spinning of the organic fiber 52 on the surface of the base 50, may be performed with a method other than electrospinning. For example, the sheet 51 of the organic fiber 52 may be formed on the surface of the base 50 by any of the ink-jet method, the jet-dispenser method, and the splay-application method, instead of the electrospinning method.

After the sheet 51 of the organic fiber 52 is formed on the base 50 by spinning, such as an electrospinning method, the base 50 on which the sheet 51 is formed is transferred to the stripping machine 5. Then, the processing by the stripping machine 5 is performed.

Figure 3:
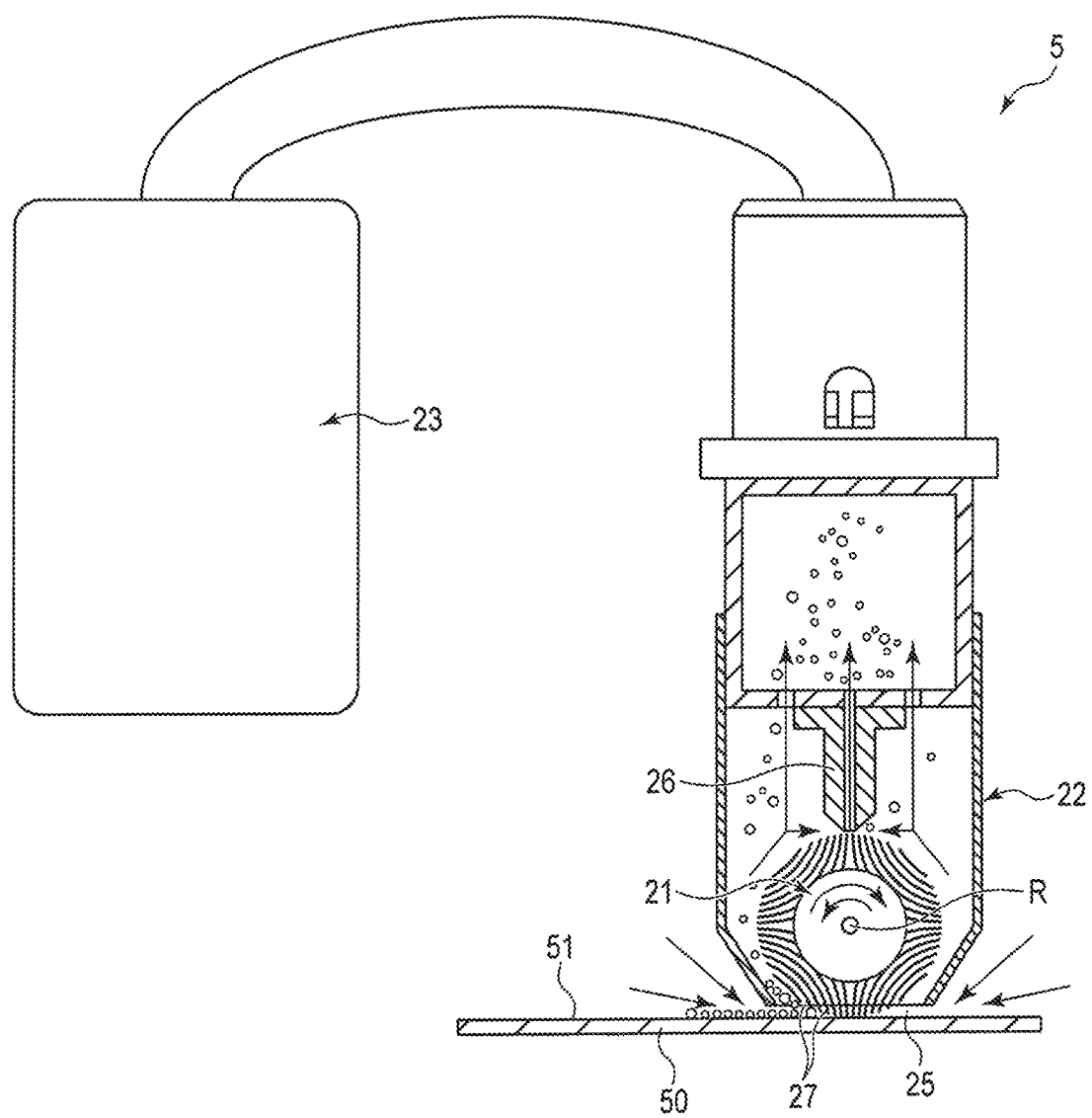
FIG. 3 is a schematic diagram showing a configuration of a stripping machine according to the embodiment.

FIG. 3 shows a configuration of the stripping machine 5. The stripping machine 5 includes a rotational brush 21, a suction head 22, and a dust collector 23. The rotational brush 21 is mounted on the suction head 22, and in the present embodiment, is arranged inside the suction head 22. The rotational brush 21 is rotatable around a rotation axis R with respect to the suction head 22. The suction head 22 has a suction opening 25, and the inside of the suction head 22 opens to the outside at the suction opening 25. In the inside of the suction head 22, a cleaner 26 is arranged, and the rotation axis R is located between the suction opening 25 and the cleaner 26. When the dust collector 23 is driven, a suction force from the suction opening 25 of the suction head 22 toward the inside of the suction head 22 is generated, and a suction force from the inside of the suction head 22 toward the dust collector 23 is generated.

In the present embodiment, the rotational brush 21 is brought into contact with the sheet 51 of the organic fiber in the surface of the base 50. At this time, at the suction opening 25 of the suction head 22, the rotational brush 21 is in contact with the sheet 51. Then, the rotational brush 21 is rotated while the rotational brush 21 remains in contact with the sheet 51. The organic fiber on the sheet 51 is stripped by the rotation of the rotational brush 21. In the present embodiment, the organic fiber 52 is stripped from a part of the sheet 51 by the rotational brush 21. Thus, even after the processing in the stripping machine 5 is completed, the sheet 51 of the organic fiber 52 remains on an area which has not been subjected to stripping by the rotational brush 21 on the surface of the base 50.

In addition, when the rotational brush 21 is rotationally driven, the dust collector 23 is driven. Thus, the organic fiber 52 stripped by the rotational brush 21 is suctioned into the suction head 22 from the suction opening of the suction head 22. Then, the organic fiber 52 suctioned into the inside of the suction head 22 is suctioned and collected in a tank (not shown), etc. provided in the dust collector 23. The cleaner 26 removes the organic fiber 52, etc. adhering to the rotational brush 21. Then, even the organic fiber 52, etc. removed from the rotational brush 21 by the cleaner 26 is suctioned and collected in the tank, etc. of the dust collector 23. In a state where the stripped organic fiber 52 is being suctioned from the suction opening 25, a cross-sectional area of the suction path between the suction head 22 and the base 50 is smaller than that of the inside of the suction head 22. For this reason, in a state where the stripped organic fiber 52 is being suctioned from the suction opening 25, an air-flow velocity between the suction head 22 and the base 50 is greater than that on the inside of the suction head 22.

The rotational brush 21 includes a large number of brush bristles 27. Each of the brush bristles 27 is formed of chemical fiber or animal fiber. The chemical fiber for forming the brush bristles 27 includes nylon, polypropylene, chloroethene, polyester, acrylic resin, aramid, and Teflon (registered Japanese trademark). Animal fiber for forming the brush bristles 27 may be horse hair, pig bristles, sheep wool, and deer hair. Each of the brush bristles 27 has a wire diameter from 0.1 mm to 0.5 mm and a bristle length of 30 mm or less.

However, even if the wire diameter and the bristle length of each of the brush bristles 27 fall within the above-described ranges, if the ratio of the bristle length to the wire diameter is large, an amount of the organic fiber 52 removed by the rotational brush 21 in the base 50 will decrease. Even if the wire diameter and the bristle length of each brush bristle 27 fall within the above-described ranges, if the ratio of the bristle length to the wire diameter is small, unevenness is likely formed on the surface of the base 50 after the removal of the organic fiber 52. Furthermore, even if the wire diameter and the bristle length of each brush bristle 27 fall within the above-described ranges, if the bristle length is small, the life span of the rotational brush 21 will become short. Accordingly, the wire diameter and the bristle length of each brush bristle 27 are set to appropriate dimensions within the above-mentioned ranges, in consideration of these matters.

Figure 4:
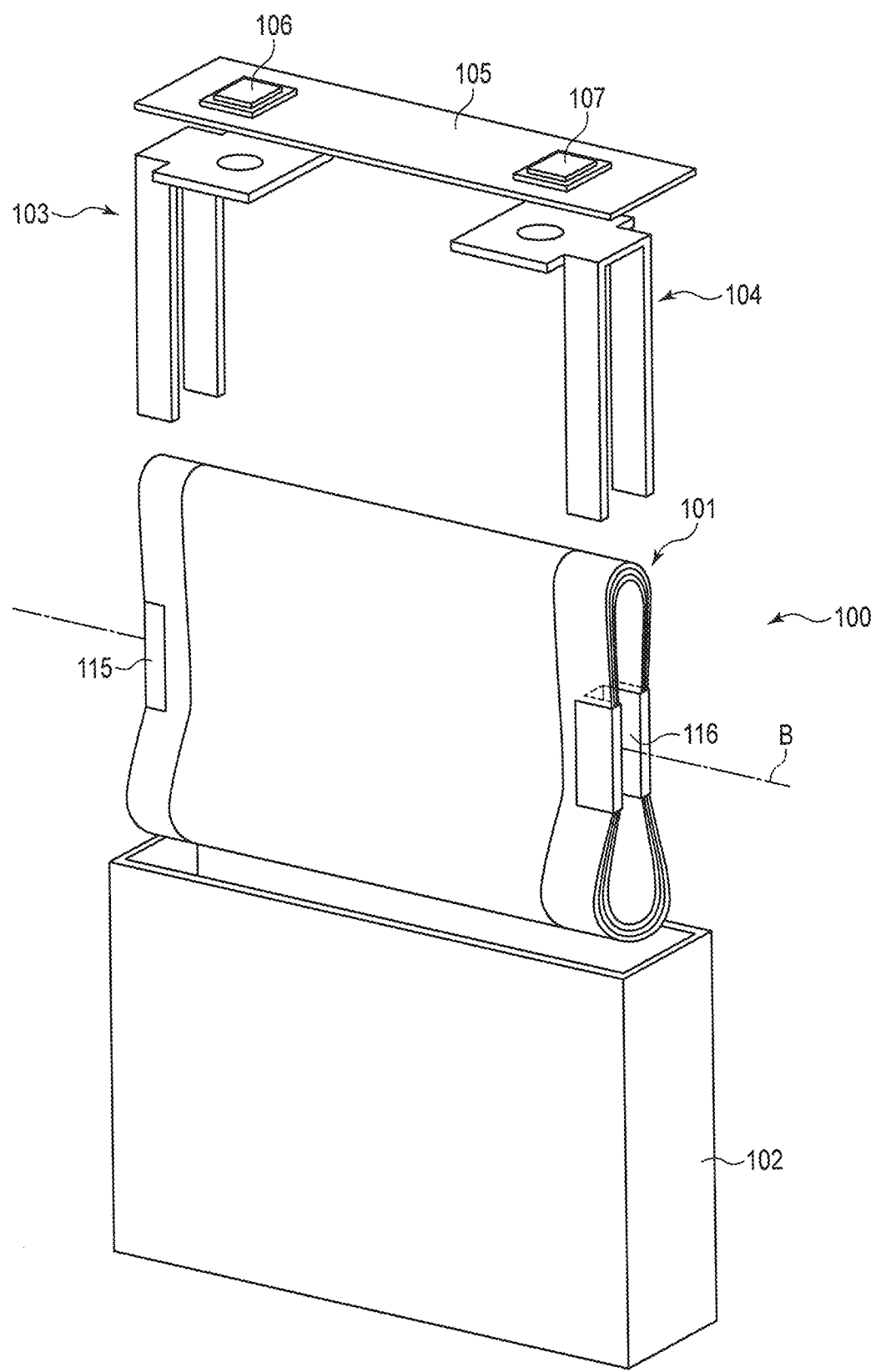
FIG. 4 is a perspective view schematically showing an example of a battery in which a negative electrode is integrally formed with a separator by the spinning apparatus according to the embodiment.

The spinning apparatus 1 of the present embodiment is used for forming a positive electrode or a negative electrode integrally with a separator in a battery, for example a nonaqueous electrolyte secondary battery or an alkaline secondary battery. FIG. 4 shows the battery 100, and in the battery 100, a separator-integrated electrode in which the negative electrode 112 (see FIG. 6) is formed integrally with the separator 113 (see FIG. 6) by the spinning apparatus 1. Herein, the battery 100 is an encapsulated-type nonaqueous electrolyte secondary battery, for example. The battery 100 includes an electrode group 101, a package can 102 in which the electrode group 101 is stored, a positive electrode lead 103 and a negative electrode lead 104 located in the package can 102, a lid 105 attached at the opening of the package can 102, and a positive electrode terminal 106 and a negative electrode terminal 107 provided in the lid 105.

The package can 102 is made of a metal, such as aluminum, an aluminum alloy, steel, or stainless steel. Inside the package can 102, the electrode group 101 is impregnated with an electrolytic solution (not shown). Instead of the package can 102, a laminated film packaging material may be provided, and the electrode group 101 may be stored in the packaging material. The positive electrode lead 103 is electrically insulated from the package can 102 and the lid 105, and electrically connected to the positive electrode terminal 106. The negative electrode lead 104 is electrically insulated from the package can 102 and the lid 105, and electrically connected to the negative electrode terminal 107.

Figure 5:
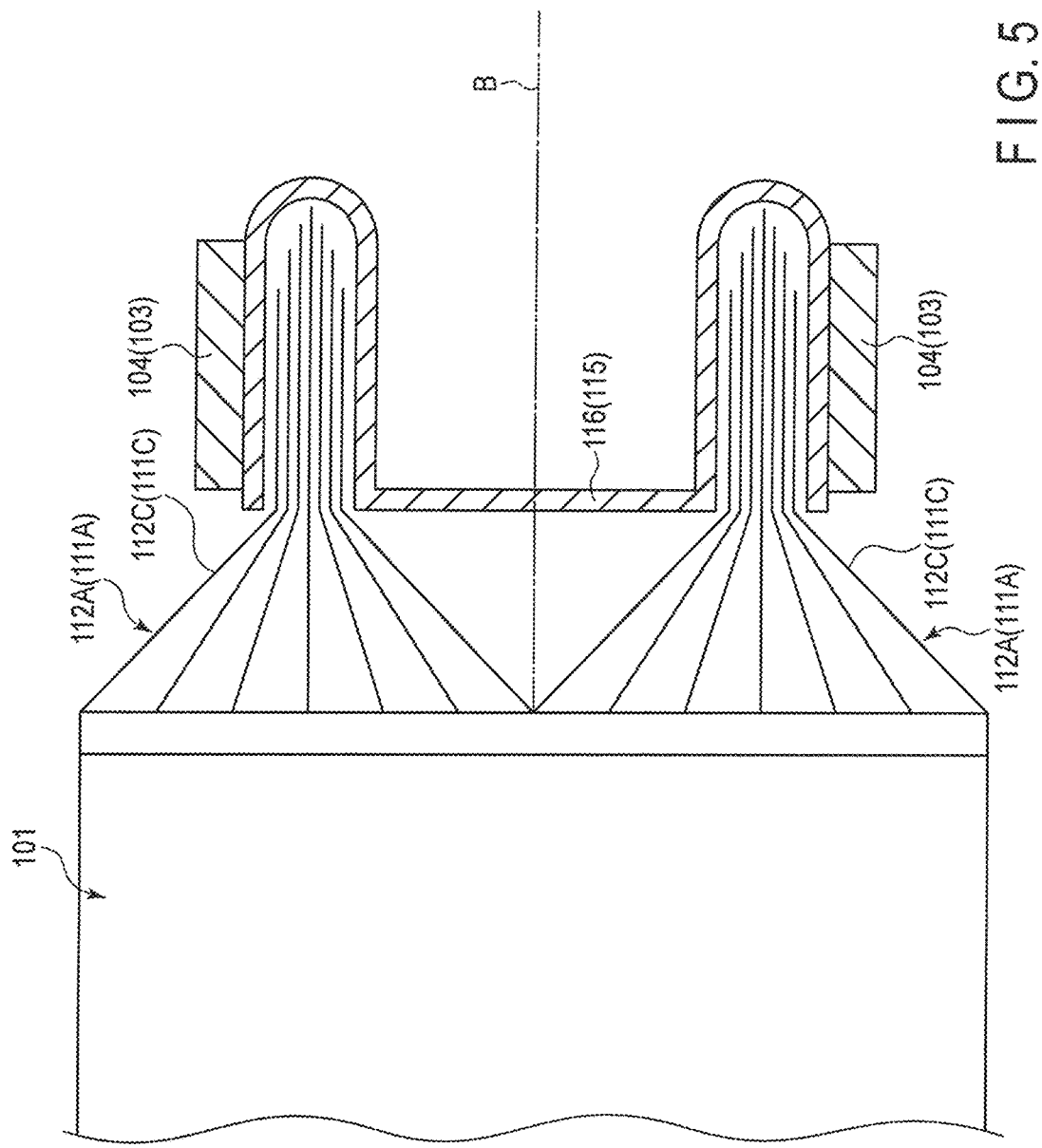
FIG. 5 is a schematic diagram showing a configuration of a portion where an electrode group is connected to one of the leads in the battery shown in FIG. 4.
Figure 6:
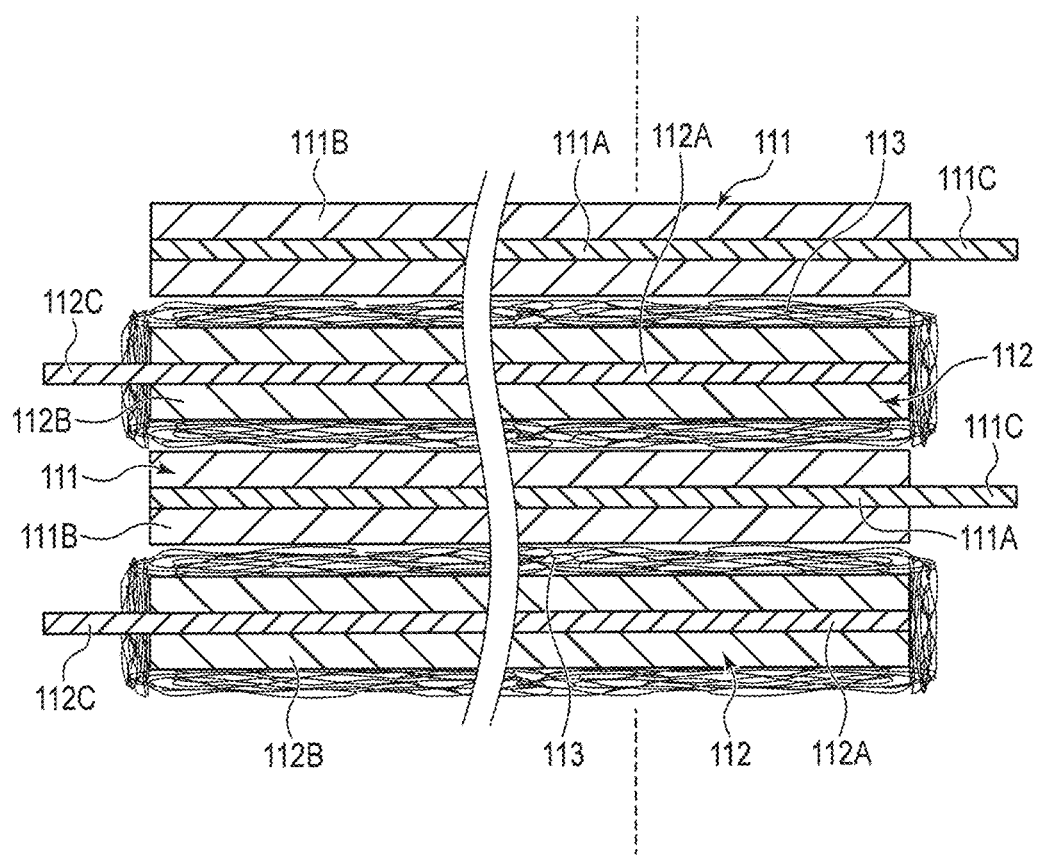
FIG. 6 is a cross-sectional view schematically showing a lamination state of a positive electrode and a negative electrode in the electrode group of the battery shown in FIG. 4.

FIG. 5 shows a structure of the portion where the electrode group 101 is connected to either one of the lead 103 or 104, and FIG. 6 shows the lamination state of the positive electrode 111 and the negative electrode 112 in the electrode group 101. In the example shown in FIGS. 4 through 6, the electrode group 101 includes the above-described positive electrode 111, negative electrode 112, and separator 113, and the separator 113 is formed integrally with the negative electrode 112. The separator 113 is attached closely and in a stationary manner to the surface of the negative electrode 112, and the separator 113 electrically insulates the positive electrode 111 from the negative electrode 112. The separator 113 is formed on the surface of the negative electrode 112 by, for example, the above-described spinning apparatus 1. Thus, the separator 113 is formed by an electrospinning method, etc., and is made of the above-described organic material filled on the inside of the spinner head 11. Accordingly, if the separator 113 is formed integrally with the negative electrode 112 by the spinning apparatus 1, the negative electrode 112 is the base 50, and the separator 113 is the sheet 51 of the organic fiber 52 formed on the surface of the negative electrode 112. Although the separator 113 formed on the negative electrode 112 will be described hereinafter, the description is applicable to a case where the separator 113 is formed on the surface of the positive electrode 111 by the spinning apparatus 1.

The positive electrode 111 includes a positive electrode current collecting foil 111A as a positive electrode current collector, and a positive electrode active material-containing layer 111B supported on the surface of the positive electrode current collecting foil 111A. The positive electrode current collecting foil 111A is aluminum foil or aluminum alloy foil, for example, and has a thickness of about 10 μm to 20 μm. Slurry including a positive electrode active material, a binding agent, and an electro-conductive agent, is applied to the positive electrode current collecting foil 111A. The positive electrode active material may be an oxide, a sulfide, or a polymer, for example, which can occlude and release lithium. For the positive electrode active material, it is preferable to use a lithium-manganese composite oxide, a lithium-nickel composite oxide, a lithium-cobalt composite oxide, and lithium iron phosphate, for example, since a high positive electrode electric potential can be obtained.

The negative electrode 112 includes a negative electrode current collecting foil 112A as a negative electrode current collector, and a negative electrode active material-containing layer 112B supported on the surface of the positive electrode current collecting foil 112A. The negative electrode current collecting foil 112A is aluminum foil or aluminum alloy foil, for example, and has a thickness of about 10 μm to 20 μm. Slurry including a negative electrode active material, a binding agent, and an electro-conductive agent, is applied to the negative electrode current collecting foil 112A. The negative electrode active material may be a metal oxide, metal sulfide, metal nitride, and alloy, for example, which can occlude and release lithium. The negative electrode active material is preferably a material which occludes and releases lithium ions at an electric potential of 0.4 V or more with respect to a metal lithium electric potential. The reaction of aluminum or an aluminum alloy with lithium is suppressed through the use of the negative electrode active material having a lithium ion occlusion-and-release electric potential as described above, which allows a use of aluminum and an aluminum alloy for a structural member related to the negative electrode current collecting foil 112A and the negative electrode 112. Accordingly, the negative electrode active material may be a lithium titanium composite oxide such as a titanium oxide or a lithium titanate, a tungsten oxide, an amorphous tin oxide, a tin silicon oxide, or a silicon oxide, for example. It is especially preferable to use a lithium titanium composite oxide as the negative electrode active material.

The aluminum alloy used for the positive electrode and the negative electrode preferably includes one, two or more kinds of elements selected from Mg, Ti, Zn, Mn, Fe, Cu and Si. The purity of aluminum and aluminum alloy may be set to 98 weight % or greater, and is preferably 99.99 weight % or greater. Pure aluminum having a purity of 100% can be used as a material for the positive electrode current collector and/or the negative electrode current collector. It is preferable to set the amount of transition metal, such as nickel and chrome contained in the aluminum and aluminum alloy, to 100 ppm by weight or less (including 0 ppm by weight).

In the example shown in FIG. 4 through FIG. 6, in the electrode group 101, the positive electrode 111, the negative electrode 112, and the separator 113 are wound in a flat shape around a winding axis B, with the separator 113 being interposed between the positive electrode 111 and the negative electrode 112. Thus, in the electrode group 101, the positive electrode ill and the negative electrode 112 are alternately laminated, with the separator 113 being interposed therebetween. In the positive electrode current collecting foil 111A, the long sides thereof constitute a pair of side edges, and one of the side edges and its vicinity constitute a positive electrode current collecting tab 111C. The positive electrode current collecting tab 111C is formed in the direction along the winding axis B for a predetermined distance from the side edge, and the positive electrode active material-containing layer 111B is not supported on the positive electrode current collecting tab 111C. In the negative electrode current collecting foil 112A, the long sides thereof constitute a pair of side edges, and one of the side edges and its vicinity constitute a negative electrode current collecting tab 112C. The negative electrode current collecting tab 112C is formed in the direction along the winding axis B for a predetermined distance from the side edge, and the negative electrode active material-containing layer 112B is not supported on the negative electrode current collecting tab 112C.

In the electrode group 101, the positive electrode 111 and the negative electrode 112 deviate with respect to each other in the direction along the winding axis B. Accordingly, the positive electrode current collecting tab 111C on which the positive electrode active material-containing layer 111B is not supported projects to one side in the direction along the winding axis B with respect to the negative electrode 112 and the separator 113. The negative electrode current collecting tab 112C on which the negative electrode active material-containing layer 112B is not supported projects to the side opposite to that towards which the positive electrode current collecting tab 111C projects, in the direction along the winding axis B with respect to the positive electrode 111 and the separator 113. In the example shown in FIGS. 4 through 6, the direction along the winding axis B is parallel or approximately parallel in the direction of the long side of the lid 105.

In the positive electrode current collecting tab 111C, the surfaces of the positive electrode current collecting foil 111A are joined by ultrasonic welding, etc. The positive electrode current collecting tab 111C is bundled by the positive electrode backup lead 115, and joined to the positive electrode backup lead 115 by ultrasonic welding, etc. The positive electrode backup lead 115 is joined to the positive electrode lead 103 by ultrasonic welding, etc. For this reason, the positive electrode current collecting foil 111A is electrically connected to the positive electrode terminal 106 via the positive electrode backup lead 115 and the positive electrode lead 103.

Similarly, in the negative electrode current collecting tab 112C, the surfaces of the negative electrode current collecting foil 112A are joined by ultrasonic welding, etc. The negative electrode current collecting tab 112C is bundled by the negative electrode backup lead 116, and joined to the negative electrode backup lead 116 by ultrasonic welding, etc. The negative electrode backup lead 116 is joined to the negative electrode lead 104 by ultrasonic welding, etc. For this reason, the negative electrode current collecting foil 112A is electrically connected to the negative electrode terminal 107 via the negative electrode backup lead 116 and the negative electrode lead 104.

When the battery 100 is manufactured, the separator 113 is formed on, for example, the surface of the negative electrode 112 by the spinning apparatus 1, before the positive electrode 111 and the negative electrode 112 are wound. In the negative electrode 112, slurry including the negative electrode active material is applied to the negative electrode current collecting foil 112A before the processing by the spinning apparatus 1 is performed. At this time, the slurry including a negative electrode active material is not applied to one of the side edges and its vicinity, namely an area in which the negative electrode current collecting tab 112C is formed. For this reason, on the surface of the negative electrode current collecting foil 112A, the negative electrode active material-containing layer 112B is formed in an area other than that on which the negative electrode current collecting tab 112C is formed.

Figure 7:
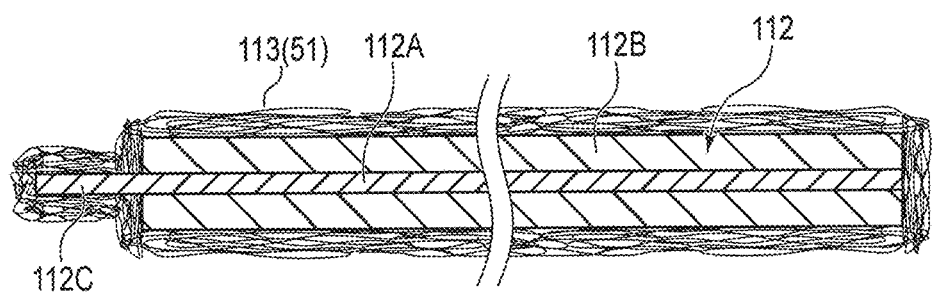
FIG. 7 is a cross-sectional view schematically showing a state of the negative electrode immediately after the processing by the sheet forming machine is finished in a case where the separator is integrally formed with the negative electrode by the spinning apparatus according to the embodiment.

When the separator 113 is formed integrally with the negative electrode 112 by the spinning apparatus 1, the sheet 51 of the organic fiber 52 is formed on the surface of the negative electrode 112 by the above-described electrospinning method, etc. in the sheet forming machine 2. FIG. 7 shows a state of the negative electrode 112 immediately after the processing by the sheet forming machine 2 is completed.

As shown in FIG. 7, in the sheet forming machine 2, the sheet 51 of the organic fiber 52 is formed on the entire surface of the negative electrode 112. For this reason, immediately after the processing in the sheet forming machine 2, the sheet 53 covers both the area where the negative electrode active material-containing layer 112B is supported on the negative electrode current collecting foil 112A and its adjacent (continuing) area where the negative electrode active material-containing layer 112B is not supported. Accordingly, the portion that constitutes the negative electrode current collecting tab 112C is also covered by the sheet 51 immediately after the processing in the sheet forming machine 2 is performed. Immediately after the processing in the sheet forming machine 2 is performed, both side edges of the negative electrode current collecting foil 112A, namely both long sides, are also covered by the sheet 51.

Figure 8:
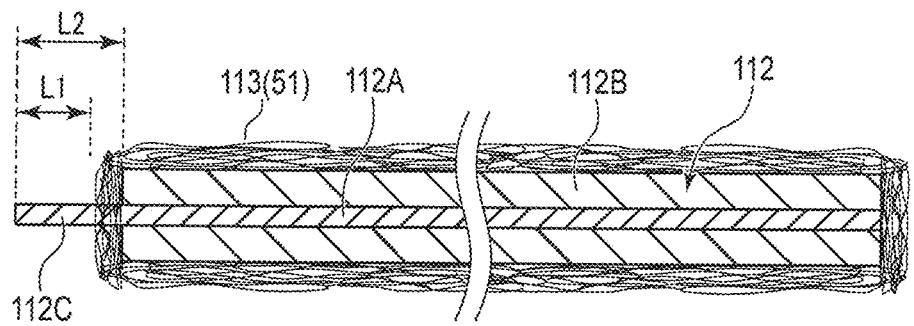
FIG. 8 is a cross-sectional view schematically showing a state of the negative electrode immediately after the processing by the stripping machine is finished in a case where the separator is integrally formed with the negative electrode by the spinning apparatus according to the embodiment.

Then, in the spinning apparatus 1, after the sheet 51 is formed by the sheet forming machine 2 as described above, the organic fiber 52 is stripped from a part of the sheet 51 by the stripping machine 5. FIG. 8 shows a state of the negative electrode 112 immediately after the processing by the stripping machine 5 is completed. As shown in FIG. 8, the stripping machine 5 strips the organic fiber 52 from a part of the area that constitutes the negative electrode current collecting tab 112C. At this time, in the negative electrode current collecting tab 112C, the organic fiber 52 is stripped, for a predetermined dimension L1, from the side edge of the negative electrode current collecting foil 112A on the side of the negative electrode current collecting tab 112C. Herein, the predetermined dimension L1 is smaller than a length L2 from the side edge of the negative electrode current collecting foil 112A on the side of the negative electrode current collecting tab 112C to the end of the negative electrode active material-containing layer 112B on the side of the negative electrode current collecting tab 112C. For this reason, the organic fiber 52 is not stripped from the entire part of the negative electrode current collecting tab 112C on which the negative electrode active material-containing layer 112B is not supported. Thus, even after the processing by the stripping machine 5 is completed, a part of the negative electrode current collecting tab 112C is covered by the sheet 51 of the organic fiber 52. The sheet 51 partially covering the negative electrode current collecting tab 112C ensures the electrical insulation of the negative electrode current collecting tab 112C from the portion on which the positive electrode active material containing layer 111B is not supported, in the edge opposite to the positive electrode current collecting tab 111C of the positive electrode 111. The electrical insulation of the positive electrode current collecting tab 111C from the portion in which the negative electrode active material containing layer 112B is not supported in the edge opposite to the negative electrode current collecting tab 112C of the negative electrode 112, is also ensured.

As described above, in the spinning apparatus 1, the sheet 51 is formed on the entire surface of the negative electrode 112, which serves as the base 50, by the sheet forming machine 2. Accordingly, in the sheet forming machine 2, it is unnecessary to perform control, etc. to prevent the formation of the sheet 51 of the organic fiber 52 on the area on which the negative electrode active material-containing layer 112B is not supported in the negative electrode current collecting foil 112A. For this reason, in the sheet forming machine 2, the control of the spinner head 11 and the voltage generator 12 does not become complicated in the sheet forming machine 2. Furthermore, since the sheet 51 is formed on the entire surface of the negative electrode 112, the uniformity of the film thickness in the sheet 51 of the organic fiber 52 can be ensured. Thus, the sheet 51 of the organic fiber 52 is appropriately formed integrally with the negative electrode 112, which serves as the base 50.

In the spinning apparatus 1, the stripping machine 5 strips off the organic fiber 52 from a part of the area that constitutes the negative electrode current collecting tab 112C. In other words, the organic fiber 52 is appropriately removed from the portion to be joined to the negative electrode current collecting foil 112A. This appropriate removal of the organic fiber 52 from the area that constitutes the negative electrode current collecting tab 112C allows appropriate joining between the surfaces of the negative electrode current collecting foil 112A in the negative electrode current collecting tab 112C. This appropriate removal of the organic fiber 52 from the area that constitutes the negative electrode current collecting tab 112C allows for appropriate joining of the negative electrode current collecting tab 112C to the negative electrode lead 104 via the negative electrode backup lead 116.

In the present embodiment, the organic fiber 52 stripped by the rotational brush 21 is suctioned from the suction opening 25 of the suction head 22, and collected by the dust collector 23. For this reason, the stripped organic fiber 52 is appropriately collected.

Figure 9:
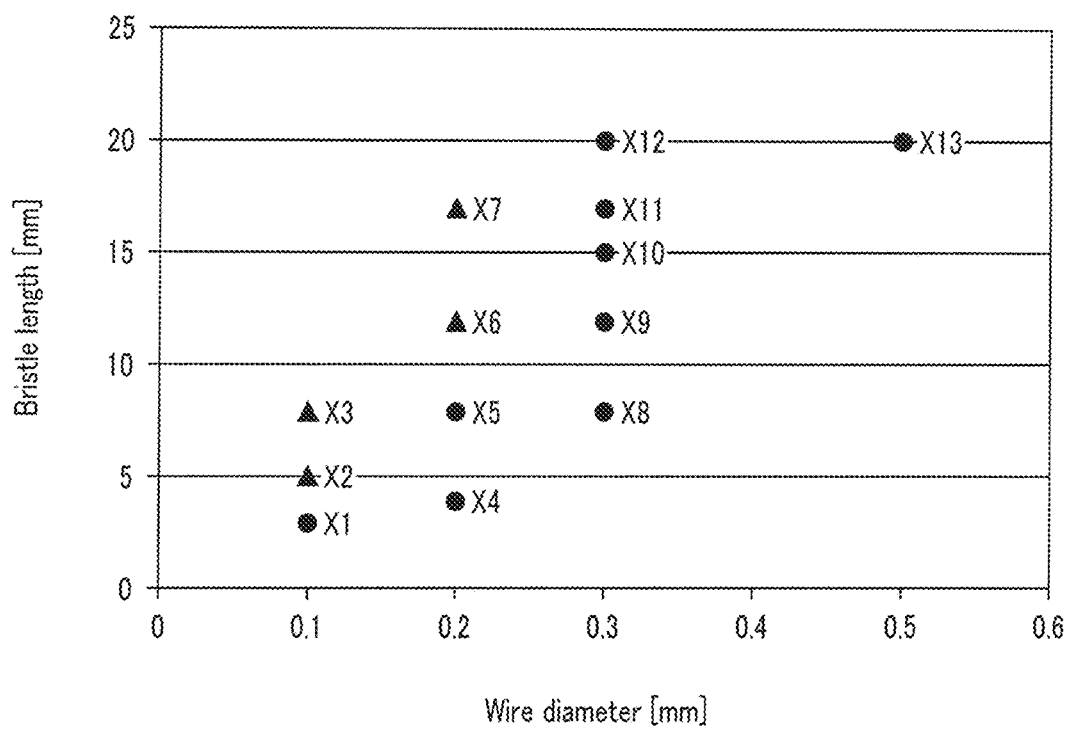
FIG. 9 is a graph showing experiment data on the influence of wire diameters and bristle lengths of brush bristles on the removal of organic fiber by a rotational brush according to the embodiment.

FIG. 9 shows experiment data on the influence of wire diameters and bristle lengths of brush bristles 27 on the removal of organic fiber 52 by the rotational brush 21. The experiment data of FIG. 9 shows verification performed on the brush bristles 27 for the following conditions: condition X1 (the wire diameter 0.1 mm, the bristle length 3 mm), condition X2 (the wire diameter 0.1 mm, the bristle length 5 mm), condition X3 (the wire diameter 0.1 mm, the bristle length 8 mm), condition X4 (the wire diameter 0.2 mm, the bristle length 4 mm), condition X5 (the wire diameter 0.2 mm, the bristle length 8 mm), condition X6 (the wire diameter 0.2 mm, the bristle length 12 mm), condition X7 (the wire diameter 0.2 mm, the bristle length 17 mm), condition X8 (the wire diameter 0.3 mm, the bristle length 8 mm), condition X9 (the wire diameter 0.3 mm, the bristle length 12 mm), condition X10 (the wire diameter 0.3 mm, the bristle length 15 mm), condition X11 (the wire diameter 0.3 mm, the bristle length 17 mm), condition X12 (the wire diameter 0.3 mm, the bristle length 20 mm), and condition X13 (the wire diameter 0.5 mm, the bristle length 20 mm). For the verification under each of the conditions X1 through X13, a base 50 similar to the aforementioned negative electrode 112 was used, and the organic fiber 52 was formed by the electrospinning method. Furthermore, for the verification under each of the conditions X1 through X13, polyimide is used as an organic material for forming the organic fiber 52, and N-methylpyrrolidone (NMP) is used as a solvent in which the organic material is dissolved. For the verification under each of the conditions X1 through X13, the voltage between the spinner head 11 and the base 50 was set to 30 kV when the verification was conducted. Furthermore, for the conditions X1 through X13, aluminum alloy foil having aluminum purity of 99 weight % or greater and a thickness of 15 μm was used as the negative electrode current collecting foil 112A, which serves as the base 50. For the conditions X1 through X13, lithium titanate having a spinel structure was used as the negative electrode active material.

According to the experiment data of FIG. 9, influence of the wire diameter and the brush length of each brush bristle 27 on the removal of the organic fiber 52 was verified through observation of the portion from which the organic fiber 52 was stripped on the surface of the base 50 with a microscope. Also, an area ratio of the organic fiber 52 in the portion from which the organic fiber 52 is stripped was obtained, and the influence of the wire diameter and the brush length of each brush bristle 27 on the removal of the organic fiber 52 was verified based on the obtained area ratio. Herein, the area ratio is a ratio of the area of the unremoved organic fiber 52 to the area of the entire area of 6 mm from the side edge of the negative electrode current collecting foil 112A on the side of the negative electrode current collecting tab 112C. In this verification, the predetermined dimension L1 for the organic fiber 52 to be removed is the same, or approximately the same, as 6 mm. Herein, the distance L2 from the side edge of the negative electrode current collecting foil 112A on the side of the negative electrode current collecting tab 112C to the end of the negative electrode active material-containing layer 112B on the side of the negative electrode current collecting tab 112C is longer than 6 mm. The area ratio is calculated after the organic fiber 52 is stripped, by obtaining image data for the range of 6 mm from the side edge of the negative electrode current collecting foil 112A on the side of the negative electrode current collecting tab 112C, and performing binary computation on the obtained image data.

In the experiment data of FIG. 9, the area ratio of the organic fiber 52 after the stripping of the organic fiber 52 was lower than 20% for any of the conditions X1 through X13. Herein, before the organic fiber 52 was stripped, the area ratio of the organic fiber 52 in the mentioned range is usually 90% or greater. Accordingly, regardless of the conditions X1 through X13, when the fiber stripping is performed, the organic fiber 52 is removed from the surface of the negative electrode current collecting foil 112A (base 50), compared to the surface before the stripping is performed. For this reason, an appropriate amount of the organic fiber 52 can be removed from the surface of the base 50 if each of the brush bristles 27 has a wire diameter in the range of 0.1 mm and 0.5 mm and a bristle length of 30 mm or shorter. For this reason, through setting the wire diameter and the brush length of each of the brush bristles 27 to the above-mentioned ranges, the strength of the joint between the surfaces of the negative electrode current collecting foil 112A in the negative electrode current collecting tab 112C can be secured, and the strength of the joint between the negative electrode current collecting tab 112C, the negative electrode backup lead 116, and the negative electrode lead 104 can be secured.

In the experiment data of FIG. 9, the above-mentioned area ratio became lower than 5% under the conditions of X1, X4, X5, X8 through X13. In other words, among the conditions X1 through X13, the amount of the organic fiber removed from the base 50 became large under the conditions X1, X4, X5, X8 through X13. Accordingly, even in a case where the wire diameter falls under the range of 0.1 mm to 0.5 mm and the bristle length is 30 mm or shorter in each of the brush bristles 27, particularly the case where the wire diameter is 0.2 mm or greater, or the ratio of the brush length with respect to the wire diameter is smaller than 50, the amount of the organic fiber 52 removed from the surface of the base 50 becomes large. In this case, the strength of the joint between the surfaces of the negative electrode current collecting foil 112A in the negative electrode current collecting tab 112C can be further improved, and the strength of the joint between the negative electrode current collecting tab 112C, the negative electrode backup lead 116, and the negative electrode lead 104 can be further improved.

In a case where a negative electrode current collecting foil 112A similar to that used in the experiment data of FIG. 9 is used, under the conditions X4 and X8, unevenness is formed on the area from which the organic fiber 52 is stripped in the surface of the negative electrode current collecting foil 112A that serves as the base 50. Accordingly, if a negative electrode current collecting foil 112A similar to that used in the experiment data of FIG. 9 is used, when the ratio of the brush length with respect to the wire diameter in each of the brush bristles 27 becomes smaller than 30, the pressing force of the rotational brush 21 becomes stronger, and unevenness is easily formed on the area from which the organic fiber 52 is stripped. Whether or not unevenness is formed on the area from which the organic fiber 52 is stripped in the surface of the base 50 varies in accordance with a material that constitutes the base 50 and the thickness of the base 50, etc., for example in accordance with purity of the aluminum of the negative electrode current collecting foil 112A and the thickness of the negative electrode current collecting foil 112A, etc. If the purity of aluminum is 98 weight % or greater, and the thickness is in the range of 10 μm and 20 μm, a tendency similar to the experiment data of FIG. 9 can be obtained.

Figure 10A:
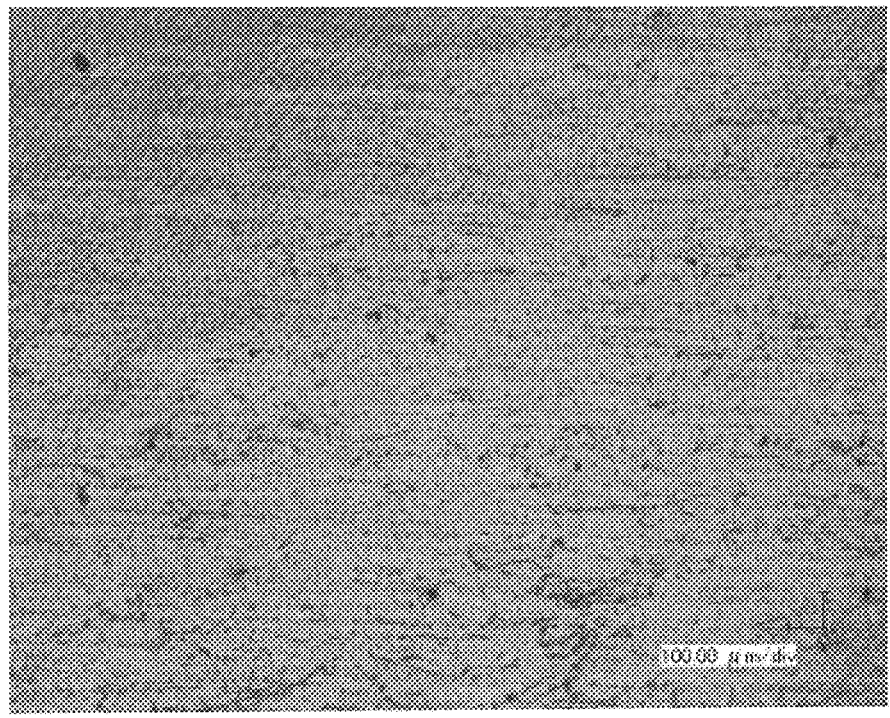
FIG. 10A is a diagram showing an electron microscope image of an area from which organic fiber is stripped in the surface of the negative electrode current collecting foil, in a case where organic fiber is stripped under a condition X9 shown in FIG. 9.
Figure 10B:
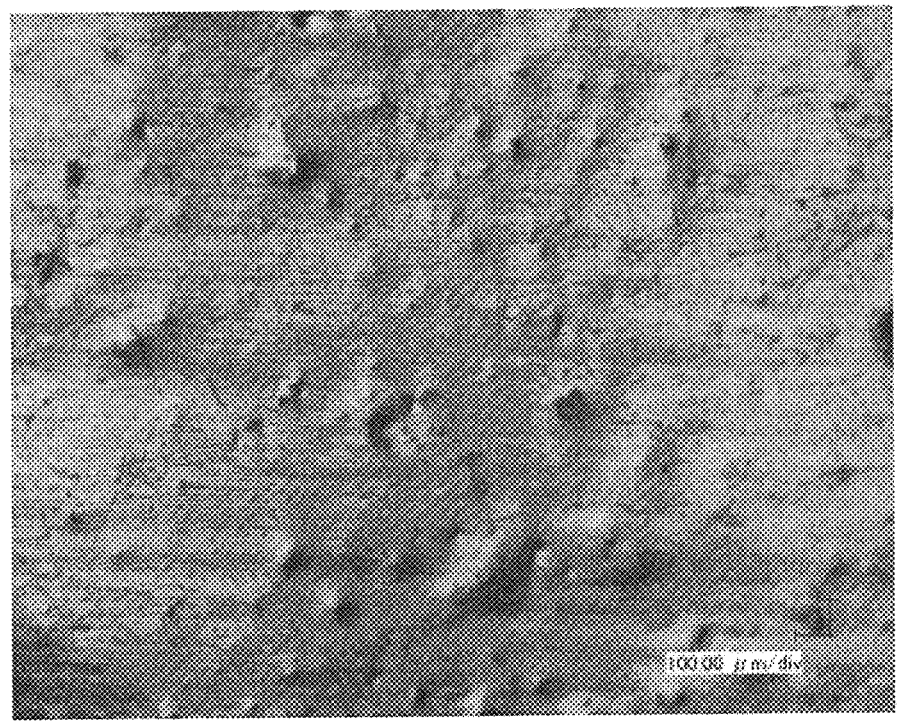
FIG. 10B is a diagram showing an electron microscope image of an area from which organic fiber is stripped in the surface of a negative electrode current collecting foil, in a case where organic fiber is stripped under a condition X4 shown in FIG. 9.
Figure 10C:
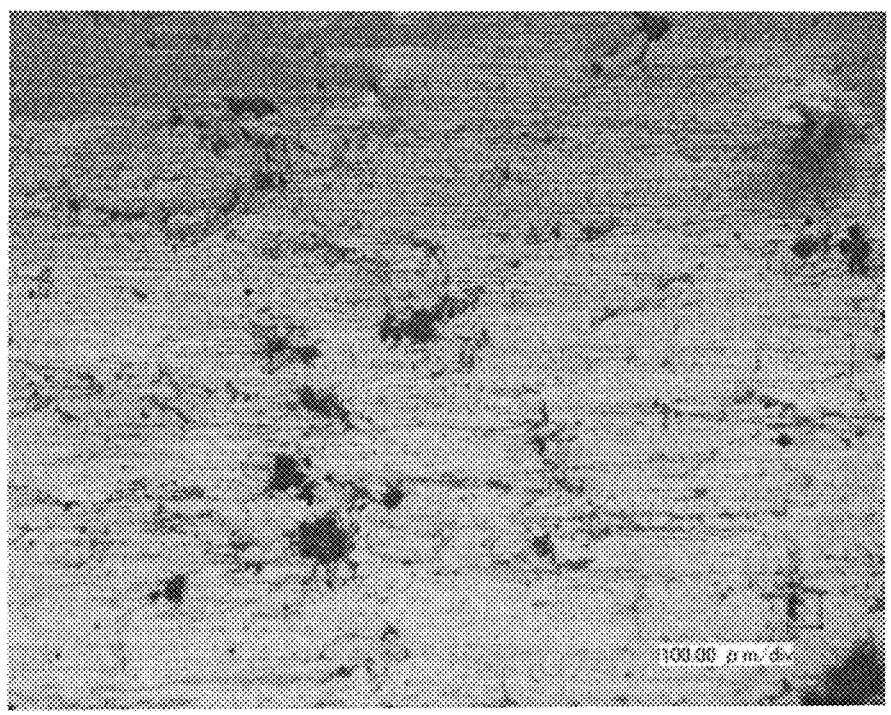
FIG. 10C is a diagram showing an electron microscope image of an area from which organic fiber is stripped in the surface of a negative electrode current collecting foil, in a case where organic fiber is stripped under a condition X7 shown in FIG. 9.

In FIG. 9, the conditions X1, X4, X5, and X8 through X13 in which the area ratio is 5% or lower are indicated by black dots, and the conditions X2, X3, X6, and X7 in which the area ratio is 5% or greater and 20% or less are indicated by black triangles. FIGS. 10A through 10C show electron microscope images of the areas from which the organic fiber 52 has been removed in the surface of the negative electrode current collecting foil 112A. FIG. 10A shows the area where the fiber has been stripped under the condition X9; FIG. 10B shows the area where the fiber has been stripped under the condition X4; and FIG. 10C shows the area where the fiber has been stripped under the condition X7.

As shown in FIGS. 10A through 10C, the amounts of the organic fiber 52 removed by the rotational brush 21 under the conditions X4 and X9 are greater than that under the condition X7. Under the condition X9, the surface of the base 50 in the area from which the organic fiber 52 has been stripped becomes smoother than the case of condition X4.

According to the spinning apparatus of at least one of the embodiments or examples, the spinning apparatus includes a spinning head that forms a sheet of organic fiber on a surface of a base, and a rotational brush configured to strip the organic fiber from a part of the sheet. It is thereby possible to provide a spinning apparatus that appropriately forms an organic fiber sheet integrally with an electrode by spinning, and appropriately removes, after spinning, organic fiber from a portion to which a collector is joined in the electrode.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A spinning apparatus comprising:
   a sheet forming machine comprising:
      a spinning head inside of which an organic material can be filled up;
      a rotational brush which includes a plurality of brush bristles and configured to be rotationally driven; and
   wherein the sheet forming machine is configured to control the spinning head and the rotational brush to:
      make the spinning head eject the organic material filled up on a surface of a base to form a sheet of an organic fiber on the surface of the base in a state that both side edges of the base are covered by the sheet of the organic fiber;
      rotate the rotational brush while the brush bristles are in contact with the sheet in the surface of the base;
      make the rotational brush strip the organic fiber from a part of the sheet by the rotation so that the part of the sheet, in which the organic fiber is stripped, is formed for only a predetermined dimension from one of the both side edges, one of the both side edges being not covered by the sheet of the organic fiber and the other of the both side edges being covered by the sheet of the organic fiber after stripping by the rotational brush; and
      make the rotational brush strip the organic fiber from the part of the sheet by the rotation so that a part of an outer surface of the base, on which the organic fiber is stripped, is exposed to an outside.

2. The spinning apparatus according to claim 1, wherein each of the brush bristles of the rotational brush has a wire diameter in the range of 0.1 mm and 0.5 mm, and a brush length is 30 mm or shorter.

3. The spinning apparatus according to claim 2, wherein each of the brush bristles of the rotational brush has the wire diameter of 0.2 mm or greater, or a ratio of the brush length to the wire diameter is smaller than 50.

4. The spinning apparatus according to claim 1, further comprising:
   a suction head on which the rotational brush is mounted and which has a suction opening, wherein
   the sheet forming machine is further configured to control the suction head to suction the organic fiber removed by the rotational brush from the suction opening.

5. The spinning apparatus according to claim 1, further comprising:
   a voltage generator which is configured to apply a voltage between the spinning head and the base, wherein
   the sheet forming machine is configured to control the voltage generator to apply the voltage between the spinning head and the base so that the organic material is ejected onto the surface of the base from the spinning head.

6. A manufacturing method of a sheet of an organic fiber, comprising:
   ejecting an organic material filled up inside of a spinning head onto a surface of a base to form a sheet of an organic fiber on the surface of the base in a state that both side edges of the base are covered by the sheet of the organic fiber;
   rotating a rotational brush, which includes a plurality of brush bristles, while the brush bristles are in contact with the sheet in the surface of the base;
   stripping the organic fiber from a part of the sheet by the rotation of the rotational brush so that the part of the sheet, in which the organic fiber is stripped, is formed for only a predetermined dimension from one of the bath side edges, one of the both side edges being not covered by the sheet of the organic fiber and the other of the both side edges being covered by the sheet of the organic fiber after stripping by the rotational brush; and stripping the organic fiber from the part of the sheet by the rotation so that apart of an outer surface of the base, in which the organic fiber is stripped, is exposed to an outside.

* * * * *